March 15, 1960    J. L. GOLDSMITH    2,928,264
DRIVE COUPLINGS
Filed March 14, 1957
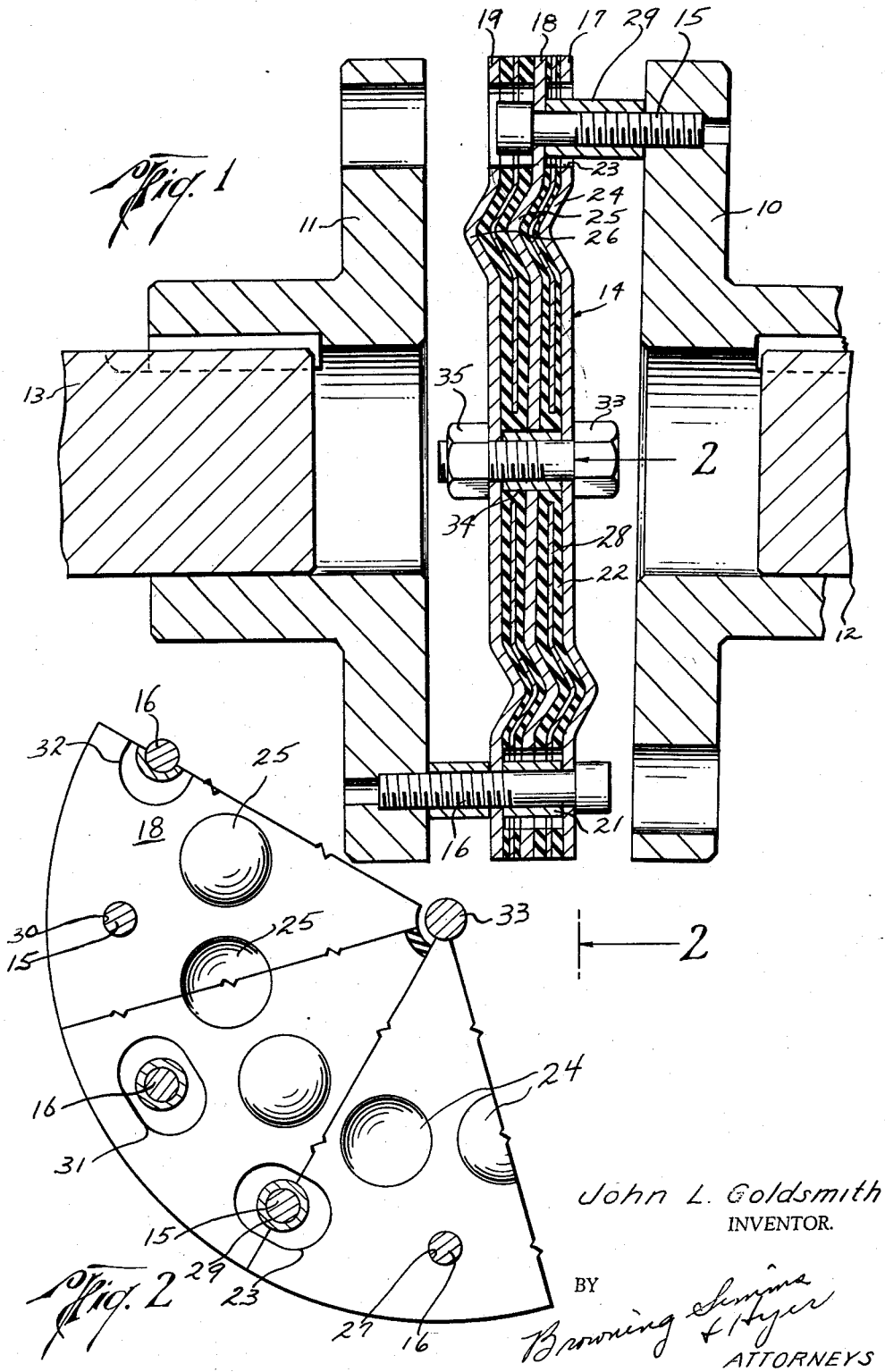
John L. Goldsmith
INVENTOR.
BY
Browning Simms & Hyer
ATTORNEYS

United States Patent Office 2,928,264
Patented Mar. 15, 1960

2,928,264

DRIVE COUPLINGS

John L. Goldsmith, Houston, Tex., assignor to Hudson Engineering Corporation, Houston, Tex., a corporation of Texas Application March 14, 1957, Serial No. 645,983

10 Claims. (Cl. 64—27)

This invention relates to couplings and more particularly to drive couplings of the type having a resilient connection to permit misalignment and reduce wear.

Present day machinery requires the use of many varieties of couplings. In service which will permit, it is desirable to use resilient members to transmit torque through the coupling. The resilient members of the coupling absorb shock and vibration without damage. Such couplings do not wear as rapidly as metallic flexible couplings and do not require lubrication.

Couplings transmitting torque through resilient members such as rubber have their own special problems. They have been designed with cups and fingers to contain the rubber. Such design is expensive as it requires at best casting or forging of a number of the coupling parts.

Resilient connections between shafts permit the coupling parts to move laterally of the normal rotational axis of the coupling, that is, into parallel misalignment. When this occurs, the several parts of the coupling are rotating about laterally displaced axes. When shafts are not in alignment, there frequently is a tendency for some of the coupling parts to move laterally relative to other coupling parts and due to this parallel misalignment, there results excessive vibrations and whip which is very undesirable. Former attempts to force the coupling parts to rotate about a fixed point have resulted in metal-to-metal engagement between coupling parts and in many instances has been only partially successful.

This invention provides a coupling of the resilient type in which the coupling members may assume positions of misalignment, but are held against parallel misalignment. Therefore, relative lateral movement between the coupling parts which would cause vibrations is prevented. In the preferred form of this invention, the interaction between the coupling members through the resilient means tends to force the coupling members to rotate about a central point. An aligning means is also provided to achieve the same results under extreme service conditions. Under normal service conditions, there will be no metal-to-metal contact which will cause wear due to the aligning means. Under severe conditions, the metal-to-metal contact of the aligning means is such that wear will be very slight.

The coupling of this invention may be manufactured at minimum cost. Many of the coupling parts may be stamped from sheet stock. The resilient portions of the coupling may be molded in place if desired. Many of the parts are duplicates of each other to further reduce cost.

It is an object of this invention to provide a drive coupling of the resilient type which may be manufactured at minimum cost.

Another object is to provide a resilient coupling in which many of the parts are standard articles of commerce and in which many other parts may be stamped from sheet stock.

Another object is to provide a resilient coupling in which an aligning means forces the several parts of the coupling to rotate about axes passing substantially through a fixed point.

Another object is to provide a resilient coupling in which the interengagement between the drive and driven parts through the resilient means forces the several parts of the coupling to rotate about axes passing substantially through a fixed point to avoid lateral displacement of portions of the coupling which would cause vibrations.

Another object is to provide a resilient coupling in which the interengagement between the drive and driven parts coact to prevent parallel misalignment under normal service conditions and in which a secondary aligning means is provided which functions under severe operating conditions to prevent parallel misalignment.

Other objects, features and advantages of the invention will appear from the specification, the drawing and the claims.

In the drawing wherein there is shown by way of illustration one embodiment of this invention:

Fig. 1 is a view in longitudinal cross section through a coupling embodying this invention; and Fig. 2 is a view along the lines 2—2 of Fig. 1 with the resilient means omitted and with the several discs broken away progressing in a clockwise direction to show a segment of one of the driven discs, then a segment of the disc embedded within the resilient member, and then a segment of the central drive disc.

The coupling illustrated in the drawings is provided with end fittings 10 and 11 which may be secured to opposed shafts 12 and 13, respectively. The end fittings are in the general form of flange connections internally keyed to receive shafts.

In the description to follow, the flange 10 will be considered the drive flange and the flange 11 the driven flange but it will be understood that the coupling may be driven from either end.

Interposed between the flanges 10 and 11 is an assembly indicated generally at 14 which provides for resilient transmission of torque between the flanges and for misalignment of the shafts 12 and 13. The assembly 14 is secured to the drive flange 10 by a ring of drive bolts, one of which is indicated at 15. The assembly is secured to the flange 11 by a ring of driven bolts, one of which is shown at 16.

The assembly 14 includes a plurality of coupling members 17, 18, and 19, preferably disc shaped. It will be understood that there could be more than three coupling parts if desired. These coupling members are arranged side by side and are held assembled in this relationship by the bolts 16 passing through a spacer 21 interposed between the two exterior coupling members 17 and 19. It will be appreciated that this construction is repeated at spaced points about the assembly adjacent its rim.

With the outside coupling members held in spaced relationship by the ring of bolts 16, the innermost coupling member 18 may float therebetween without metal-to-metal contact with the outside coupling members if the spaces between the several coupling members are filled with resilient material such as the sheet material shown at 22. In this connection it is pointed out that the coupling members 17 and 19 are provided with oblong holes 23 best seen in Fig. 2 through which the bolts 15 pass in securing the intermediate coupling member 18 to the drive flange 10.

Inasmuch as the central coupling member floats between the two exterior coupling members, the two flanges 10 and 11 are free to cock relative to each other to provide for misalignment of the shafts 12 and 13.

Provision is made for transmission of torque between the drive flange 10 and the driven flange 11 by providing mating drive and driven means on the several coupling members. The drive and driven means on the coupling members may take any desired form which will transmit torque through the sheet of rubber therebetween. Preferably, the drive and driven means are provided by mating indentations, such as dimples 24, 25, and 26, respectively, in coupling members 17, 18, and 19. While these dimples may be positioned at any place on the coupling members, it is preferred that they be arranged in a circle concentric with the axis of rotation of the coupling. It is further preferred that alternate dimples be formed in opposite directions so that slippage between the coupling members would require not only withdrawal of mating dimples but passage of opposed dimples over each other.

Preferably, the coupling members are formed from sheet metal which may be readily stamped in a single operation to form the holes therethrough and the several dimples.

In order to reinforce the resilient material 22 which may be formed in sheets or may be molded in place, it is desired to provide within each sheet of resilient material between adjacent coupling members a thin metallic disc 28 which will reinforce the resilient material. It will further effectively reduce the thickness of the resilient material between adjacent metallic members and thereby reduce the tendency of the material to give and permit the dimples to pass over each other. In small couplings the disc 28 may not be needed. On the other hand, each resilient sheet may require more than one disc in large couplings. In this connection it is noted that the bottom of each dimple is received within the dimple of the adjacent coupling member or spacer disc 28, as the case may be. Referring now to Fig. 2, a section of disc 17 is shown at the bottom of the figure. The bolt 16 passes through a hole 27 in the disc with very little clearance and the disc 17 is secured by bolt 16 to the driven flange 11. Progressing clockwise about the figure, the next bolt encountered is one of the bolts 15 which secures the drive disc 18 to the drive flange 10. Therefore, the outside disc 17 is provided with an oblong opening so that the disc 17 will not engage the bolt 15 or the spacer sleeve 29 which spaces the coupling assembly 14 from the drive flange 10.

Proceeding clockwise, the next disc shown is disc 28 which is embedded within the resilient means 22. This disc is provided at each of the bolts 15 and 16 with an oblong slot-way 31 so that these discs are not engaged by either the drive or driven bolts at any time.

Proceeding further clockwise, the third disc shown is the drive disc 18 which is provided with an oblong slot 32 through which one of the bolts 16 passes without engagement therebetween. Bolt 15 passes through a close fitting hole 30 and imparts rotary motion to the drive disc 18 upon rotation of drive flange 10.

Fig. 2 best illustrates the position of the several dimples in a circle concentric about the central axis of the coupling. As shown, they are close together and if mating dimples tended to slip over each other, they would immediately come in contact with adjacent dimples over which they could not pass.

It will be appreciated that the several dimples coact with each other in the manner of wedge surfaces when the flange 11 is driven by flange 10. In so doing, they tend to align the rotational axes of the flanges 10 and 11. Even in the event the shafts 12 and 13 are misaligned, the wedge action of the coacting dimples will tend to prevent parallel misalignment of the flanges 10 and 11. That is, both the drive disc 18 and the driven discs 17 and 19 will tend to rotate about a point halfway between discs 17 and 19 and lying on the central axes of the coupling discs when they are not misaligned. Note that this condition is illustrated in Fig. 1. The action of the several dimples will be sufficient to maintain the several parts of the coupling against lateral displacement relative to each other which would cause vibrations except under the most severe conditions.

In order to guard against parallel misalignment of the coupling parts under severe conditions, a special aligning means is provided. This auxiliary aligning means should be such as to provide a minimum metal-to-metal engagement between the several coupling members. On the other hand, it should not interfere with the free action of the coupling members in providing for misalignment of the flanges 10 and 11. For these reasons, the special aligning means is provided at the center of rotation of the coupling where the necessary metal-to-metal engagement will be small.

The special aligning means is provided by a bolt 33 extending through the discs 17, 18, and 19. A spacer sleeve 34 extends between the driven discs and the nut 35 on bolt 33 may, therefore, be run up tight and the aligning means serve as a part of the means for assembling the coupling members and preventing their spreading apart. The clearance between the spacing sleeve 34 and the drive disc 18 is small, but sufficient to permit the drive disc 18 to cock relative to the driven discs and provide for misalignment. It is also such that no metal-to-metal contact will exist except under severe operating conditions. It will be appreciated that the close tolerance between the disc 18 and the sleeve 34 will prevent lateral displacement of the coupling members relative to each other and, therefore, parallel misalignment of the coupling parts will be guarded against even under the most severe conditions.

Couplings constructed in accordance with this invention will be particularly useful in absorbing backlash in the shafts. They will also absorb a thrust load.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

The invention having been described, what is claimed is:

1. A flexible drive coupling comprising, a plurality of disc shaped coupling members arranged side by side, a plurality of mating indentations in the several coupling members, mating indentations on adjacent members having parts opposed to each other in a circumferential direction so as to approach each other on relative rotation of the adjacent members, resilient means between the mating indentations transmitting torque therebetween, and means holding the several coupling members in assembled relationship and providing for securing different ones of the coupling members to oppositely extending shafts respectively.

2. A flexible drive coupling comprising, a plurality of disc shaped coupling members arranged side by side, a plurality of mating dimples in the several coupling members eccentric to the axis of rotation of said members, resilient means between the mating dimples transmitting torque therebetween, and means holding the several coupling members in assembled relationship and providing for securing different ones of the coupling members to oppositely extending shafts respectively.

3. A flexible drive coupling comprising, at least three disc shaped coupling members arranged side by side, a plurality of mating dimples in the several coupling members eccentric to the axis of rotation of said members, resilient means between the mating dimples transmitting torque therebetween, means securing two of the coupling members together with the third floating therebetween and securing the said two coupling members to an end fitting for a shaft, and means providing for securing the floating coupling member to another end fitting for a shaft.

4. A flexible drive coupling comprising, at least three disc shaped coupling members arranged side by side, an annular ring of mating dimples in the several coupling members with alternate dimples facing in opposite directions, sheets of resilient material between the coupling members transmitting torque between the mating dimples, means securing two of the coupling members together with the third floating therebetween and securing the said two coupling members to an end fitting for a shaft, and means providing for securing the floating coupling member to another end fitting for a shaft.

5. The coupling of claim 4 wherein spacing discs are embedded in each sheet of resilient material, said spacing discs having dimples mating with the dimples in the coupling members.

6. A flexible drive coupling comprising, a plurality of coupling members having driving and driven means, respectively, means for securing said members to driving and driven shafts respectively, resilient means between the driving and driven means of the coupling members transmitting torque therebetween, and aligning means between the coupling members and providing a single pivotal connection between them positioned at the rotational axes of the coupling members when they are in alignment, said aligning means permitting misalignment of the coupling members while forcing the rotational axes of the coupling members to intersect at substantially a fixed point and prevent lateral displacement of the coupling members from said fixed point.

7. A flexible drive coupling comprising, a plurality of disc shaped coupling members arranged side by side, a plurality of mating indentations in the several coupling members, resilient means between the mating indentations transmitting torque therebetween, means holding the several coupling members in assembled relationship and providing for securing different ones of the coupling members to oppositely extending shafts, and aligning means between the coupling members and positioned at the rotational axes of the coupling members when they are in alignment, said aligning means permitting misalignment of the coupling members while forcing the rotational axes of the coupling members to intersect at substantially a fixed point and prevent lateral displacement of the coupling members from said fixed point.

8. A flexible drive coupling comprising, a plurality of disc shaped coupling members arranged side by side, a plurality of mating dimples in the several coupling members, resilient means between the mating dimples transmitting torque therebetween, means holding the several coupling members in assembled relationship and providing for securing different ones of the coupling members to oppositely extending shafts, and aligning means between the coupling members and positioned at the rotational axes of the coupling members when they are in alignment, said aligning means permitting misalignment of the coupling members while forcing the rotational axes of the coupling members to intersect at substantially a fixed point and prevent lateral displacement of the coupling members from said fixed point.

9. A flexible drive coupling comprising, at least three disc shaped coupling members arranged side by side, a plurality of mating dimples in the several coupling members, resilient means between the mating dimples transmitting torque therebetween, means securing two of the coupling members together with the third floating therebetween and securing the said two coupling members to an end fitting for a shaft, means providing for securing the floating coupling member to another end fitting for a shaft, and aligning means between the coupling members and positioned at the rotational axes of the coupling members when they are in alignment, said aligning means permitting misalignment of the coupling members while forcing the rotational axes of the coupling members to intersect at substantially a fixed point and prevent lateral displacement of the coupling members from said fixed point.

10. A flexible drive coupling comprising, at least three disc shaped coupling members arranged side by side, an annular ring of mating dimples in the several coupling members with alternate dimples facing in opposite directions, sheets of resilient material between the coupling members transmitting torque between the mating dimples, means including aligning bolt means securing two of the coupling members together with the third floating therebetween and securing the said two coupling members to an end fitting for a shaft, and means providing for securing the floating coupling member to another end fitting for a shaft, said aligning bolt means extending through the three coupling members at the rotational axes of the members when they are in alignment and having a close fit therewith and permitting misalignment of the floating coupling member relative to the outside coupling members while forcing the rotational axes of the coupling members to intersect at substantially a fixed point and prevent lateral displacement of the coupling members from said fixed point.

References Cited in the file of this patent

UNITED STATES PATENTS

| | | |
|---|---|---|
| 1,376,107 | Macdonald | Apr. 26, 1921 |
| 1,504,626 | Kinney | Aug. 12, 1924 |
| 1,573,961 | Zucker | Feb. 23, 1926 |
| 1,947,052 | Lack | Feb. 13, 1934 |
| 2,499,093 | Fast | Feb. 28, 1950 |
| 2,627,733 | Amberg | Feb. 10, 1953 |
| 2,633,719 | Riopelle | Apr. 7, 1953 |